Patented Mar. 9, 1948

2,437,370

UNITED STATES PATENT OFFICE 2,437,370

PARA-TERTIARY AMINO PHENYL ALDEHYDES

Cyril D. Wilson, Metuchen, N. J., assignor to E. I. du Pont de Nemours & Company, Wilmington, Del., a corporation of Delaware No Drawing. Application March 9, 1945, Serial No. 581,939

3 Claims. (Cl. 260—570.5)

This invention relates to the preparation of tertiary amino aromatic aldehydes. More particularly, it relates to the preparation of such aldehydes which have at least two benzene radicals each containing an aldehyde group.

An object of this invention is to provide a new process for preparing tertiary amino aromatic aldehydes. Another object is to provide such a process using simple and available reactants. Another object is to provide such a process which can be easily controlled and results in good yields. A still further object is to provide such a process which can be carried out in ordinary laboratory apparatus.

It has been found that tertiary amino aromatic aldehydes can be made by reacting a tertiary amine having at least one benzene ring attached to the amino nitrogen atom with a lower dialkyl formamide, in the presence of a chloride or oxychloride of sulfur or phosphorus. The dialkyl formamide reacts readily under such conditions and gives a good yield of p-tertiary aminobenzaldehyde. The tertiary aromatic amines should be free from substituents in the benzene ring or rings which are in the para position to the amino nitrogen atom. During the reaction a carbonyl group enters the para position to the nitrogen atom in each benzene nucleus present in the compound resulting in an aldehyde group being introduced at this point.

In accordance with the invention, a tertiary amine which contains at least one tertiary amino group and at least two phenyl radicals are used. It is advisable to have about two mols of dialkylformamide present per phenyl radical so that a polyaldehyde is formed. The remaining valence of the amino group or groups may be satisfied by an aliphatic, cycloaliphatic or aromatic hydrocarbon radical.

The reaction takes place over a fairly wide range of temperature and pressure conditions. Atmospheric, sub-atmospheric and super-atmospheric pressures, for instance, can be used at temperatures varying from about 30° C. to 180° C. and higher. It is generally advisable to keep the tertiary aromatic amine cool and then add slowly the dimethyl formamide and the chloride or oxychloride of sulfur or phosphorus. After the components have been mixed, the temperature may then be slowly raised by heating and the reaction completed. An exemplary procedure follows:

A tertiary aromatic amine is added to a reaction vessel. The reaction vessel is immersed in an ice bath or cooled by equivalent means. For each aromatic hydrocarbon radical attached to an amino group there is added dropwise a mol of dialkyl formamide and a chloride or oxychloride of sulfur or phosphorus with stirring. The dialkyl formamide may be added simultaneously with the chloride or oxychloride, or prior to the addition of the latter compound. The amount of chloride or oxychloride may vary over a very wide range but it is generally advisable to use enough to have a solvent or diluent effect on the reactants. From 1 to 3 mols of the former per mol of dialkyl formamide is a practical range. In fact, it is preferable to first admix the tertiary aromatic amine with the dialkyl formamide and then slowly add the aforesaid chloride or oxychloride. The mixture is then warmed on a steam bath for one hour and allowed to stand overnight at room temperature. The resulting solution is poured into cracked ice and neutralized with an alkaline solution, e. g., 20% aqueous sodium hydroxide. If the aldehyde reaction product crystallizes at this point, it is filtered and recrystallized from a suitable solvent. If no crystallization takes place, the product is taken up in ether, dried over sodium sulfate, and distilled at reduced pressure.

The invention will be further illustrated by the following examples. The parts are by weight.

*Example I*

Fifteen parts of tetra-ethyl-m-phenylene diamine were reacted with 5 parts of dimethyl formamide in the presence of 25 parts of phosphorus oxychloride by mixing the first two reactants and adding the latter reactant dropwise with stirring and cooling in an ice bath. The resulting mixture was warmed on a steam bath for one and one-half hours and poured into cracked ice. The aldehyde which formed was recovered by neutralizing with 20% sodium hydroxide, filtering out the aldehyde formed, and washing it with water. The ethereal fraction which contained the aldehyde recovered from the Claisen flask had a boiling point of 180° to 210° C. at 13 mm. pressure. The phenyl-hydrazone, oxime, and semicarbazone were made in the same manner described in the preceding examples and were all liquids.

*Example II*

(A) Five parts of N-N'-ethylene-bis-(methylphenylamine) were reacted with 3.1 parts of dimethyl formamide in the presence of 17 parts of phosphorus oxychloride in the same manner as described in Example I. The aldehyde, namely N-N'-ethylene - bis - (methylaminobenzaldehyde) was recovered in like manner. It was recrystallized from ethyl alcohol and had a melting point of 185° to 188° C. A carbon and hydrogen analysis was made with the following results:

Analysis: Carbon 72.63%; hydrogen 6.93%.
Theory: Carbon 73.00%; hydrogen 6.7%.

(B) Thirteen and four-tenths parts of N-N'-ethylene-bis-ethylaniline and 10 parts of dimethyl formamide were mixed and 40 parts of POCl₃ were added dropwise with cooling. The mix was allowed to stand overnight at room temperature, then heated for one hour on a steam bath. After pouring into ice the solution was neutralized with 20% NaOH, filtered and recovered from alcohol. A product having a melting point of 163° C. was obtained in a yield of 11.5 parts.

In place of the specific amines described above, there may be used in like manner any tertiary aromatic amine having at least one benzene ring attached to a tertiary amino nitrogen atom. Suitable additional amines include: N-N'-dimethyl-N-N'-di-o-tolyl-p-phenylene diamine; N-N'-dimethyl-N-N'-dinaphthyl-p-phenylene diamine; N-N'-dimethyl-N-N'-alpha-beta-tetraphenyl-ethylene diamine; N-N'-bis-cyanomethyl-N-N'-diphenyl-ethylene diamine; and 3-3'-methylene-bis-(6-brom-N-N-dimethyl-aniline).

Instead of using phosphorus oxychloride, there may be substituted in the above examples similar amounts of phosphorus trichloride, thionyl chloride, sulfuryl chloride, or sulfur dichloride. Amounts from a small fraction of a mol, e. g., one-half to several mols of such compounds can be used per mol of dialkyl formamide.

Similarly, in place of dimethylformamide, there may be substituted other lower dialkyl-formamides having from 1 to 5 carbon atoms in the alkyl groups. Additional compounds of this type are N,N-diethylformamide, N,N-dipropylformamide and N,N-diamylformamide.

The present invention has the advantage that it enables the chemist to prepare an entire class of tertiary aromatic amino aldehydes by a relatively simple and easily controllable manner. Not only can old and known aldehydes of this type be prepared but the process can be used to prepare new and analogous aldehydes of this type. In fact, new classes of para tertiary amine aldehydes containing 2 or more aldehyde groups are made possible by the invention. They have considerable utility and can be used to prepare new dyes and other chemicals. The products described in Examples V and VIII to XIV inclusive are representative of the new compounds made possible by the invention. A further advantage of the invention resides in the fact that commercially available reactants or reactants that can readily be prepared can be used.

As many apparently widely different embodiments of this invention may be made without departing from the spirit and scope thereof, it is to be understood that the invention is not limited to the specific embodiments thereof except as defined in the appended claims.

I claim:

1. A tertiary aromatic bis aldehyde of the formula:

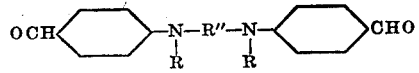

where R is an alkyl group and R'' is a divalent aliphatic hydrocarbon radical.

2. A tertiary aromatic bis aldehyde of the formula:

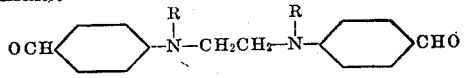

wherein R is an alkyl group.

3. The p-tertiary amino aldehyde of the formula:

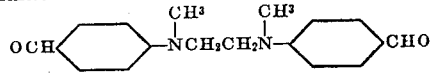

CYRIL D. WILSON.

REFERENCES CITED

The following references are of record in the file of this patent:

UNITED STATES PATENTS

| Number | Name | Date |
|---|---|---|
| 1,965,463 | Jones | July 3, 1934 |
| 2,028,141 | Ackemann | Jan. 21, 1936 |
| 2,187,328 | Richter | Jan. 16, 1940 |

FOREIGN PATENTS

| Number | Country | Date |
|---|---|---|
| 343,570 | Great Britain | Feb. 23, 1931 |
| 456,534 | Great Britain | Nov. 11, 1936 |

OTHER REFERENCES

Chem. Abstracts, vol. 32 (1938), page 490.